United States Patent
San Martin et al.

(10) Patent No.: US 7,579,841 B2
(45) Date of Patent: Aug. 25, 2009

(54) STANDOFF COMPENSATION FOR IMAGING IN OIL-BASED MUDS

(75) Inventors: Luis E. San Martin, Houston, TX (US);
Humberto E. Rosa, Houston, TX (US);
Raj Pai, Houston, TX (US); William J. Schaecher, Houston, TX (US); Myrick L. Monroe, Katy, TX (US); Marian L. Morys, Downington, PA (US); Carl Dodge, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 208 days.

(21) Appl. No.: 11/469,859

(22) Filed: Sep. 2, 2006

(65) Prior Publication Data

US 2007/0103161 A1 May 10, 2007

Related U.S. Application Data

(60) Provisional application No. 60/736,105, filed on Nov. 10, 2005, provisional application No. 60/735,107, filed on Nov. 9, 2005, provisional application No. 60/734,846, filed on Nov. 9, 2005, provisional application No. 60/734,917, filed on Nov. 9, 2005, provisional application No. 60/733,761, filed on Nov. 4, 2005.

(51) Int. Cl.
*G01V 3/20* (2006.01)
*G01V 3/24* (2006.01)

(52) U.S. Cl. .......................... 324/366; 324/370

(58) Field of Classification Search ......... 324/354–358, 324/366–367, 370–371, 373–375; 702/6–7, 702/11; 175/50
See application file for complete search history.

(56) References Cited

U.S. PATENT DOCUMENTS

| | | | |
|---|---|---|---|
| 3,470,457 A | 9/1969 | Howlett | |
| 4,931,737 A | 6/1990 | Hishiki | |
| 6,023,168 A * | 2/2000 | Minerbo | ................... 324/373 |
| 6,191,588 B1 | 2/2001 | Chen | |
| 6,348,796 B2 | 2/2002 | Evans et al. | |
| 6,564,883 B2 | 5/2003 | Fredericks et al. | |

(Continued)

FOREIGN PATENT DOCUMENTS

EP   1035299   9/2000

(Continued)

*Primary Examiner*—Bot LeDynh

(57) ABSTRACT

Oil-based mud imaging systems and methods having standoff compensation. In some embodiments, disclosed logging systems include a logging tool in communication with surface computing facilities. The logging tool is provided with a sensor array having at least two voltage electrodes positioned between two current electrodes energized by an excitation source to create an oscillatory electric field in a borehole wall. The two current electrodes are each shielded with conductive shields to prevent current leakage into the logging tool body. A common mode voltage is measured, and the phase and amplitude of the excitation source is controlled to reduce the difference between the common mode voltage and reference voltage of a voltage detector. The logging tool is further provided with electronics coupled to the voltage detector and the current electrodes to determine a differential voltage between the voltage electrodes and two current flows from separate ones of the current electrodes. From the differential voltage and multiple current flows, the computing facilities determine borehole wall resistivity, and may display the resistivity as a borehole wall image.

25 Claims, 8 Drawing Sheets

U.S. PATENT DOCUMENTS

| | | |
|---|---|---|
| 6,600,321 B2 * | 7/2003 | Evans .................. 324/369 |
| 6,603,314 B1 | 8/2003 | Kostelnicek et al. |
| 6,636,406 B1 | 10/2003 | Anthony |
| 6,891,377 B2 | 5/2005 | Cheung et al. |
| 7,109,719 B2 | 9/2006 | Fabris et al. |
| 7,119,544 B2 | 10/2006 | Hayman et al. |
| 7,242,194 B2 | 7/2007 | Hayman et al. |
| 2003/0222651 A1 | 12/2003 | Tabanou |
| 2005/0067190 A1 * | 3/2005 | Tabanou et al. ............ 175/50 |
| 2005/0179437 A1 | 8/2005 | Hayman et al. |
| 2007/0046291 A1 * | 3/2007 | Itskovich ................ 324/367 |

FOREIGN PATENT DOCUMENTS

| | | |
|---|---|---|
| EP | WO2005/059285 | 6/2005 |
| GB | 2289340 | 11/1995 |

* cited by examiner

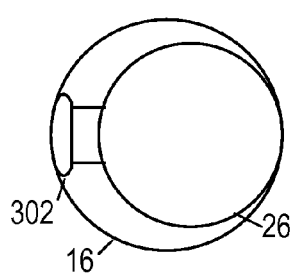
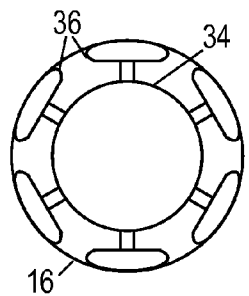
FIG. 3   FIG. 4
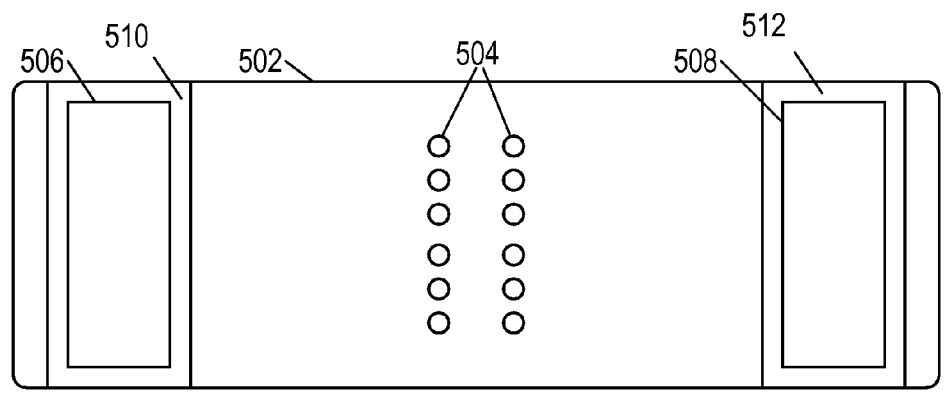
FIG. 5
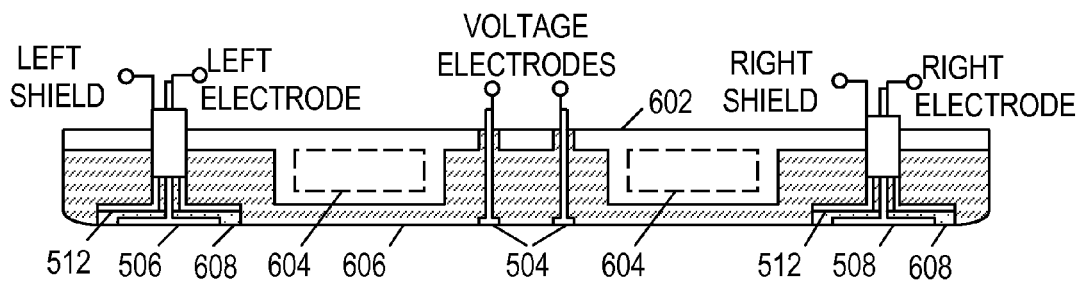
FIG. 6

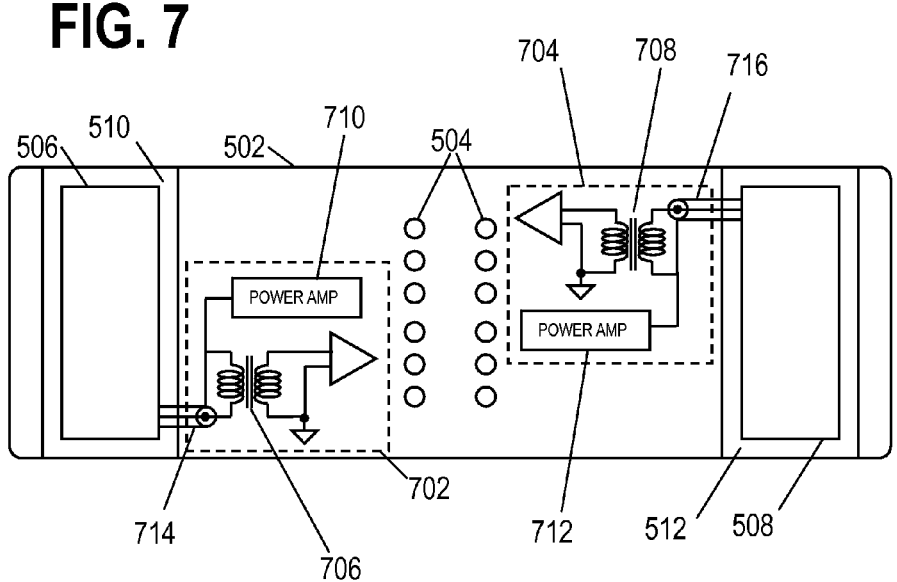
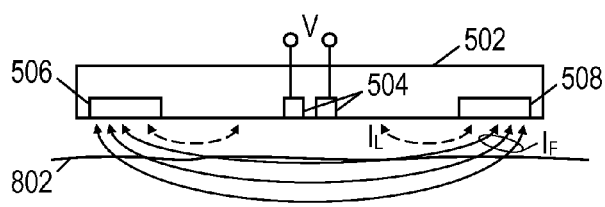
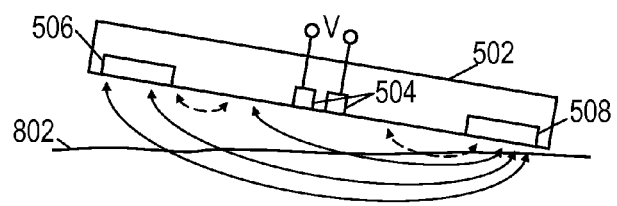

STANDOFF COMPENSATION FOR IMAGING IN OIL-BASED MUDS

CROSS-REFERENCE TO RELATED APPLICATIONS

The present application claims the benefit of, and incorporates by reference, provisional application Ser. No. 60/734,846, filed Nov. 9, 2005, and entitled "Standoff Compensation for Imaging in Oil-Based Muds." The present application additionally claims the benefit of, and incorporates by reference, the following related applications: (1) provisional application Ser. No. 60/733,761, filed Nov. 4, 2005, and entitled "Oil Based Imaging Tool that Measures Voltage Phase and Amplitude"; (2) provisional application Ser. No. 60/734,917, filed Nov. 9, 2005, and entitled "OMBI Tool with Common Mode Voltage Compensation"; (3) provisional application Ser. No. 60/735,107, filed Nov. 9, 2005, and entitled "OMBI Tool with Guarded Electrode Current Measurement"; and (4) provisional application Ser. No. 60/736,105, filed Nov. 10, 2005, and entitled "Displaced Electrode Amplifier."

BACKGROUND

Modern oil field operations demand a great quantity of information relating to the parameters and conditions encountered downhole. Such information typically includes characteristics of the earth formations traversed by the borehole, and data relating to the size and configuration of the borehole itself. The collection of information relating to conditions downhole, which commonly is referred to as "logging," can be performed by several methods including wireline logging and "logging while drilling" (LWD).

In wireline logging, a probe or "sonde" is lowered into the borehole after some or all of a well has been drilled. The sonde hangs at the end of a long cable or "wireline" that provides mechanical support to the sonde and also provides an electrical connection between the sonde and electrical equipment located at the surface of the well. In accordance with existing logging techniques, various parameters of the earth's formations are measured and correlated with the position of the sonde in the borehole as the sonde is pulled uphole.

In LWD, the drilling assembly includes sensing instruments that measure various parameters as the formation is being penetrated. While LWD techniques allow more contemporaneous formation measurements, drilling operations create an environment that is generally hostile to electronic instrumentation and sensor operations.

In these and other logging environments, it is desirable to construct an image of the borehole wall. Among other things, such images reveal the fine-scale structure of the penetrated formations. The fine-scale structure includes stratifications such as shale/sand sequences, fractures, and non-homogeneities caused by irregular cementation and variations in pore size. Orientations of fractures and strata can also be identified, enabling more accurate reservoir flow modeling.

Borehole wall imaging can be accomplished in a number of ways, but micro-resistivity tools have proven to be effective for this purpose. Micro-resistivity tools measure borehole surface resistivity on a fine scale. The resistivity measurements can be converted into pixel intensity values to obtain a borehole wall image. However, oil-based muds can inhibit such measurements due to the variability of impedance in the mud surrounding the tool. U.S. Pat. No. 6,191,588 (Chen) discloses an imaging tool for use in oil-based muds. Chen's resistivity tool employs at least two pairs of voltage electrodes positioned on a non-conductive surface between a current source electrode and a current return electrode. At least in theory, the separation of voltage and current electrodes eliminates the oil-based mud's effect on voltage electrode measurements, enabling at least qualitative measurements of formation resistivity.

In constructing an imaging tool for use in oil-based muds, certain engineering constraints on the structural strength of sensor pads will be recognized. These engineering constraints may be met by making the sensor pad base out of a metal such as steel. Though the steel can be insulated to present a non-conductive external surface, the electrical conductivity of the base creates potential current leakage paths via the metal body of the pad. These leakage paths may not only affect the accuracy of the tool's resistivity measurements, especially when the source current operating frequency increases, but may also affect the tool's resistivity measurements in a manner that is sensitive to the sensor pad's standoff with respect to the formation.

Another source of formation resistivity measurement error affected by the sensor pad's standoff from the formation is caused by the finite input impedance of the differential voltage amplifier circuitry coupled to the differential voltage sensing voltage electrodes. This standoff-affected measurement error may be further exacerbated by the presence of a common mode voltage between the formation under the voltage electrodes and the reference voltage of the amplifier circuitry. Accordingly, a standoff error compensation method is needed that reduces and minimizes the effects of leakage current and common mode voltage in borehole resistivity imaging.

BRIEF DESCRIPTION OF THE DRAWINGS

In the following detailed description, reference will be made to the accompanying drawings, in which:

FIG. 3 shows an illustrative first logging tool configuration;

FIG. 4 shows an illustrative second logging tool configuration;

FIG. 5 shows a front view of an illustrative sensor pad;

FIG. 6 shows a cross section of the illustrative sensor pad;

FIG. 7 shows an illustrative current sensor configuration;

FIG. 8A shows an illustrative current flow environment for a uniform standoff;

FIG. 8B shows an illustrative current flow environment for a tilted standoff;

The drawings show illustrative invention embodiments that will be described in detail. However, the description and accompanying drawings are not intended to limit the invention to the illustrative embodiments, but to the contrary, the intention is to disclose and protect all modifications, equivalents, and alternatives falling within the spirit and scope of the appended claims.

DETAILED DESCRIPTION

Disclosed herein are various standoff error compensation methods and systems for use with logging systems that provide images in nonconductive fluids such as an oil-based mud. In some embodiments, disclosed logging systems include a logging tool in communication with surface computing facilities such as a personal computer, server, or digital signal processing board, or some other form of computing circuit. The logging tool is provided with a sensor array having at least two voltage electrodes positioned between at least two current electrodes that create an electric field in a borehole wall, and is further provided with an electronic circuit that determines a differential voltage between the voltage electrodes and also determines two current flows from separate ones of the current electrodes. Conductive shields for the current electrodes and lines that feed the current electrodes are included to reduce the effect of current leakage on the current measurements. The current flows are measured separately in order to further enable compensation for the current leakage effects, which are a function of sensor standoff. The two current flows originate from at least two independently controlled excitation source transmitters, which produce an excitation signal that is alterable and monitored in real time in order to minimize the common mode voltage sensed at the voltage electrodes. From the differential voltage and multiple current flows, the computing facilities can determine compensated borehole wall resistivities as a function of depth and azimuth from each current electrode and average the two resistivities to compensate for standoff error, and may display the resistivity as a borehole wall image.

Figure 1:
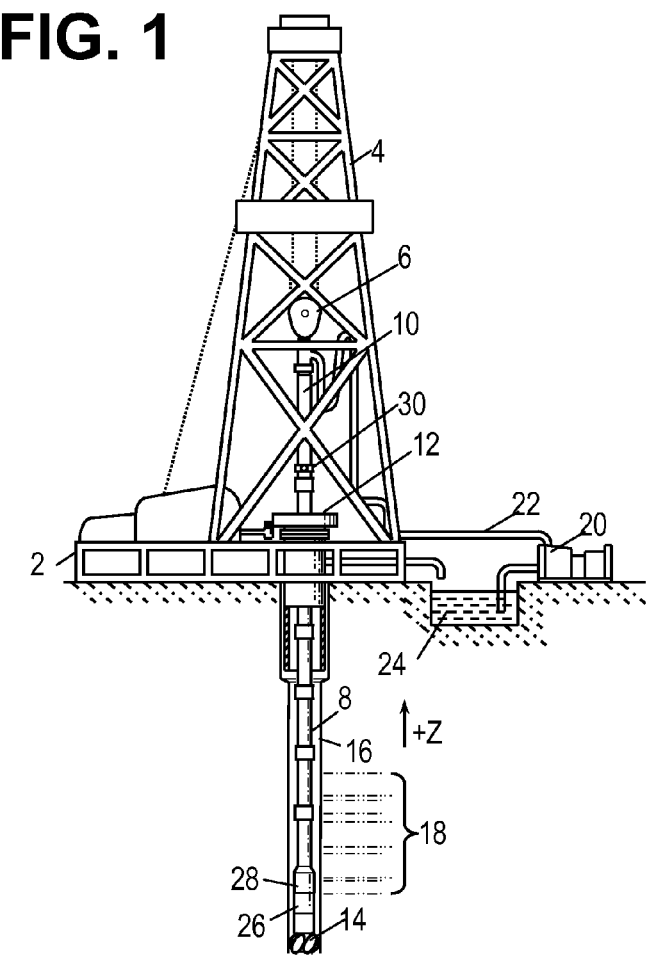
FIG. 1 shows an illustrative logging while drilling (LWD) environment.

FIG. 1 shows an illustrative logging while drilling (LWD) environment. A drilling platform 2 supports a derrick 4 having a traveling block 6 for raising and lowering a drill string 8. A kelly 10 supports the drill string 8 as it is lowered through a rotary table 12. A drill bit 14 is driven by a downhole motor and/or rotation of the drill string 8. As bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole into the pit 24 and aids in maintaining the borehole integrity.

An LWD resistivity imaging tool 26 is integrated into the bottom-hole assembly near the bit 14. As the bit extends the borehole through the formations, logging tool 26 collects measurements relating to various formation properties as well as the bit position and various other drilling conditions. The logging tool 26 may take the form of a drill collar, i.e., a thick-walled tubular that provides weight and rigidity to aid the drilling process. A telemetry sub 28 may be included to transfer tool measurements to a surface receiver 30 and to receive commands from the surface receiver.

At various times during the drilling process, the drill string 8 may be removed from the borehole. Once the drill string has been removed, logging operations can be conducted using a wireline logging tool 34, i.e., a sensing instrument sonde suspended by a cable 42 having conductors for transporting power to the tool and telemetry from the tool to the surface. A resistivity imaging portion of the logging tool 34 may have sensing pads 36 that slide along the borehole wall as the tool is pulled uphole. A logging facility 44 collects measurements from the logging tool 34, and includes computing facilities for processing and storing the measurements gathered by the logging tool.

FIG. 3 shows a cross-sectional view of LWD resistivity imaging tool 26 in a borehole 16. A biasing mechanism 302 de-centralizes tool 26 to minimize the standoff between the tool's sensors and the borehole wall. The tool's sensors may be located in a pad on biasing mechanism 302, or alternatively the sensors may be located in the main body of the tool opposite the biasing mechanism. As the tool 26 rotates and progresses downhole at the drilling rate, the sensors will trace a helical path on the borehole wall. Orientation sensors within the tool may be used to associate the resistivity measurements with the sensors' positions on the borehole wall. Surface computing facilities may collect resistivity measurements, orientation (azimuth) measurements, and tool position measurements, and may process the collected measurements to create a resistivity image of the borehole wall.

FIG. 4 shows a cross-sectional view of the wireline resistivity imaging tool 34 in a borehole 16. (Some LWD imaging tool embodiments may be constructed with a similar configuration.) Sensing pads 36 are deployed against the borehole wall to minimize standoff. Multiple pads may be used to obtain measurements over a greater fraction of the borehole's circumference. In some embodiments, the pads are provided in axially-offset groups to increase circumferential coverage without undue crowding in the undeployed configuration.

Figure 2:
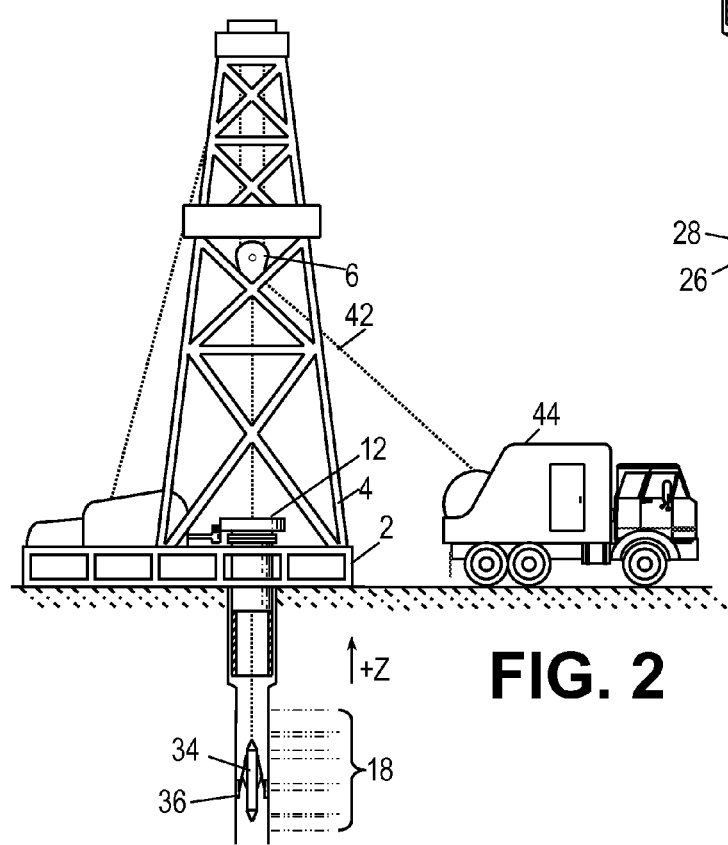
FIG. 2 shows an illustrative wireline logging environment.

In the logging scenarios described above with respect to FIGS. 1 and 2, the drilling fluid present in the borehole is an electrically nonconductive fluid such as an oil-based mud. Some of the fluid may mix with drill cuttings or material from the borehole walls to form a viscous semi-solid layer on the borehole walls. This layer is commonly termed "mudcake", and it prevents intimate contact between logging sensors and uncontaminated formation material. In addition, motion of the logging instruments may create a fluid flow layer that further separates the logging sensors from the uncontaminated formation materials.

The mudcake and fluid flow layers have a very low conductivity, which creates some difficulty for oil-based mud imaging of borehole wall resistivity. Measurements through the low-conductivity layers may be improved by (1) using an alternating current, (2) increasing the distance between the voltage electrodes in order to increase the signal level, and (3) using a source current with a higher operating frequency to increase the capacitive coupling to the formation.

FIG. 5 shows the face of an illustrative sensor pad 502 having six pairs of voltage electrodes 504 positioned between current electrodes 506 and 508. In practice, the sensor pads may be provided with additional voltage and current electrodes, and in fact may operate on multiple axes. With uniaxial sensor pads such as pad 502, the length of the sensor pad is kept parallel to the long axis of tool 34. The distance between the current electrodes 506, 508 controls the depth of investigation, with greater distances providing greater depths of investigation. The distances between the voltage electrodes 504 controls the spatial resolution of the tool, with smaller distances providing higher resolutions. Behind each of the current electrodes 506, 508 is a corresponding conductive shield 510, 512, which may alternatively be termed a "guard electrode". The shields ("guard electrodes") may be maintained at the same potential as the corresponding current electrode so as to minimize leakage currents from the current electrodes.

A cross-section of the illustrative sensor pad 502 is shown in FIG. 6. Sensor pad 502 comprises a metal substrate 602 to provide the pad with the needed rigidity and strength. The metal substrate 602 may include cavities 604 to hold sensor circuitry. For illustrative purposes, the electrode feeds are shown passing through the sensor pad 502, but the electrode feeds may alternatively connect to the sensor circuitry in cavities 604 or in a central cavity (not shown).

In some embodiments, metal substrate 602 comprises steel. The face of metal substrate 602 is covered with an insulating layer 606, which in some embodiments comprises a polyetheretherketone (PEEK) material. Current electrodes 506 and 508 are embedded on the face of the insulating layer 606. Shields 510 and 512 separate the current electrodes 506 and 508 from the body of pad 502, and the lines that feed current electrodes 506, 508 are preferably also shielded, possibly with the line shields in a coaxial cable or triaxial cable configuration. In some embodiments, shields are also provided for the voltage electrodes and voltage electrode feeds. Separating the current electrodes from the electrode shields are insulating inserts 608, which in some embodiments comprise a PEEK material.

When tool 34 is operated at a very low source current frequency of excitation (i.e., approximately less than 2-5 kHz), the capacitive coupling to the metal body of sensor pad 502 is negligible, meaning that the current leakage between current electrodes 506, 508 and the metal body of sensor pad 502 is very small. However, the operation of tool 34 at low current frequencies may result in poor accuracy when measuring borehole wall resistivity due to the small amount of current that is injected into the formation and the low voltage difference generated between voltage electrodes 504. The use of higher frequencies (e.g., in excess of 5 kHz) can increase the current flow and as a result provide more accurate measurements of the adjacent borehole wall resistivity. Unfortunately, an increase in the excitation current frequency produces a corresponding undesirable increase in current leakage from current electrodes 506, 508 to the metal body of sensor pad 502. As a result, the measurement voltage difference between voltage electrodes 504 may not be helpful in creating an accurate indication of the true borehole wall resistivity adjacent to tool 34. Further, the voltage measurements may be subject to increased inaccuracies in situations where the standoff of tool 34 is uneven.

In order to reduce the amount of leakage current that results when the frequency of operation exceeds 5 kHz, in certain embodiments of the present invention a conductive shield 510, 512 is placed behind each of corresponding current electrode 506, 508. Alternatively, it is contemplated that in certain embodiments only one conductive shield may be used with a single corresponding current electrode. For example, tool 34 may be configured where current electrode 506 is shielded by the inclusion of conductive shield 510, while current electrode 508 is left unshielded.

Shield 510, 512 may alternatively be termed a "guard electrode." The shields 510, 512 may be maintained at the same electric potential as the corresponding current electrodes 506, 508, thereby preventing current flow between the current electrodes and guard electrodes. Further, any leakage currents from the current electrodes to the metal body of sensor pad 502 are minimized, and any current leakage into the metal body of tool 34 primarily originates from shields 510, 512. The ability to minimize the leakage of current from the current electrodes to the metal body of sensor pad 502 in the present invention becomes more important as higher source current operating frequencies are utilized. As the frequency of operation increases, the amount of capacitive coupling to the metal body of sensor pad 502 increases current leakage and (absent any guard electrodes) negatively affects the accuracy of tool 34 in determining borehole wall resistivity.

In addition to minimizing the current leakage from current electrodes 506, 508 to the metal body of sensor pad 502, the manner of measuring the current flowing into current electrodes 506, 508 is adapted in view of the inclusion of shields 510, 512. Referring to FIG. 7, current sensors 702, 704 in illustrative embodiments of the present invention include transformers 706, 708 that are used to assist in measuring the current associated with current electrodes 506, 508. Further, power amplifiers 710, 712 provide the source current in the present embodiment. In the illustrative embodiment, transformer 706 is coupled between power amplifier 710 and the left current electrode 506 so that the current measurement includes only the current that flows into current electrode 506 and not the current that flows into shield 510. Similarly, transformer 708 is coupled between the power amplifier 712 and the right current electrode 508 so that the current measurement includes only the current that flows into current electrode 508 and not the current that flows into shield 512. In the embodiments where only one of current electrode 506, 508 is shielded, the inclusion of a current sensor may be limited to the one of current sensor 702, 704 that corresponds to the shielded current electrode. As a result of the described placement of current sensors 702, 704 with respect to current electrodes 506, 508, only the current associated with the current electrode that is shielded is measured by a current sensor.

In this configuration, the amount of leakage current into the metal body of sensor pad 502 can be compensated for during the current measurement process. The total current present in sensor pad 502 comprises the current flowing into current electrodes 506, 508 and the current leaking from shields 510, 512. Since the total current from the source is known, and the current flowing into current electrodes 506, 508 is measured as a result of the shield and current sensor configuration described above, the current leakage flowing from shields 510, 512 can be compensated for since it is isolated from the corresponding current sensor and not measured. As a result, current flow from the shields 510, 512 is not included as part of the measured current flow from the current electrodes 506, 508 and does not distort the measurement of the current injected into the formation.

As previously discussed, line shields 714, 716 are shown to guard the lines that feed current electrodes 506, 508. The presence of line shields 714, 716 reduce the asymmetry in the current leakage along the feed lines, which may be present due to different leakage paths or different lengths of feed lines. The elimination of the leakage current asymmetry is desirable because when accomplished, all the asymmetry in the current measurements taken during the operation of tool 34 may be attributed to uneven standoff along the surface of sensor pad 502.

As shown in FIG. 8A, the current electrodes drive an electric field having field lines IF that penetrate a borehole wall 802. However, the conductive elements in sensor pad 502 also permit the formation of leakage current field lines IL that couple the electrodes via the sensor pad body. The number of these leakage current field lines varies as a function of standoff, i.e., the separation between the sensor pad and the borehole wall. Moreover, as FIG. 8B shows, the field distribution may be asymmetric due to pad tilt or heterogeneities in the mud layer and borehole wall.

The electrode shields are designed to minimize symmetric leakage currents. The leakage current field lines that completely bypass the formation will primarily couple to the electrode shields, although a small direct coupling from the current electrodes to the tool body will always exist. However, the leakage current field lines that pass through both the formation and a portion of the pad body will couple a current electrode to the opposite electrode shield, causing an imbalance between the current electrodes. Accordingly, the various embodiments of the resistivity imaging tool described herein include circuitry for measuring the current from each current electrode separately, and for combining the separate current measurements with the voltage electrode measurements to determine a standoff-compensated resistivity.

In some embodiments, the voltage of each current electrode (relative to the tool body) is measured and multiplied by an air calibration constant to determine the baseline current from that current electrode. The air calibration constant may be determined experimentally, such as by measuring the current from the current electrodes while the pad is suspended in air. This baseline current may be used to reduce the error due to the small leakage current flow from the current electrodes to the body of the tool that remains after the shield configuration is incorporated. Note that the current electrodes may be at different voltages, causing a different baseline current to be determined for each current electrode. The corrected current values are determined by subtracting each baseline current from the measured current for the respective current electrode, thereby excluding from the measurement the small amount of current leaking from the current electrodes to the tool body.

Figure 9:
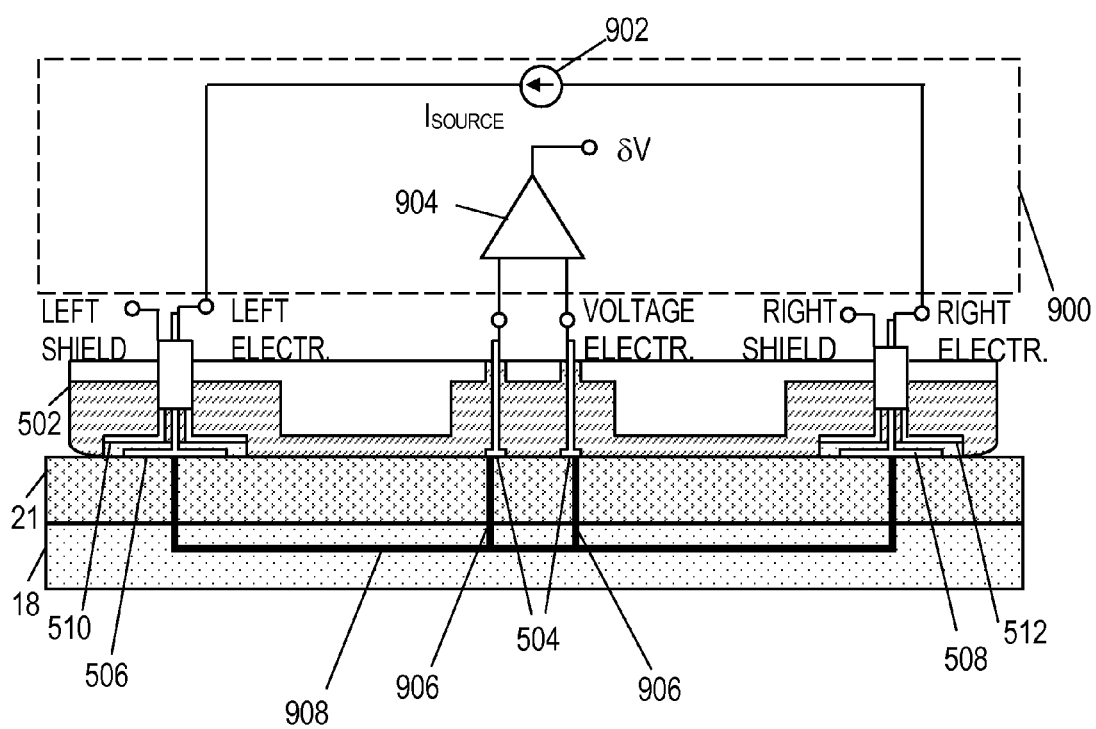
FIG. 9 shows an illustrative sensor pad circuitry configuration.

Referring now to FIG. 9, a first illustrative configuration of an oil-based mud imaging (OBMI) tool is shown. Circuit 900 represents a simplified illustration of excitation current source 902 and differential voltage amplifier 904. During the use of an OBMI tool having this configuration, a significant source of error in the measurement of formation resistivity values arises from inaccuracies in the voltage measurements of tool 34 caused by the finite input impedance of the differential voltage amplifier 904 coupled to voltage electrodes 504. The large but non-infinite input impedance of the differential voltage amplifier 904 allows a small amount of current 906 to flow into the amplifier electronics. This current flow causes a voltage drop in the mud layer 21 in front of voltage electrodes 504. Since the mud layer 21 in front of each voltage electrode 504 is not uniform, the occurrence of each voltage drop is different. As a result, an erroneous and unwanted voltage differential is created between voltage electrodes 504 and is superimposed to the voltage difference that is proportional to the resistivity of formation 18 generated by current flow 908 that flows parallel to the surface of pad 502. This erroneous and unwanted voltage differential attributable to the finite input impedance of amplifier 904 is, to a first order approximation, proportional to the common mode voltage.

The effect of this measurement error may be more significant during the measurement of formations with a low resistivity (i.e., less than 5 Ohm-m) using the current injection method described above, wherein the measurement of a low voltage difference between voltage electrodes 504 may be needed. In order to reduce the measurement error due to the effect of common mode voltage on the differential voltage, the common mode voltage at voltage electrodes 504 is minimized in the preferred embodiments.

Figure 10A:
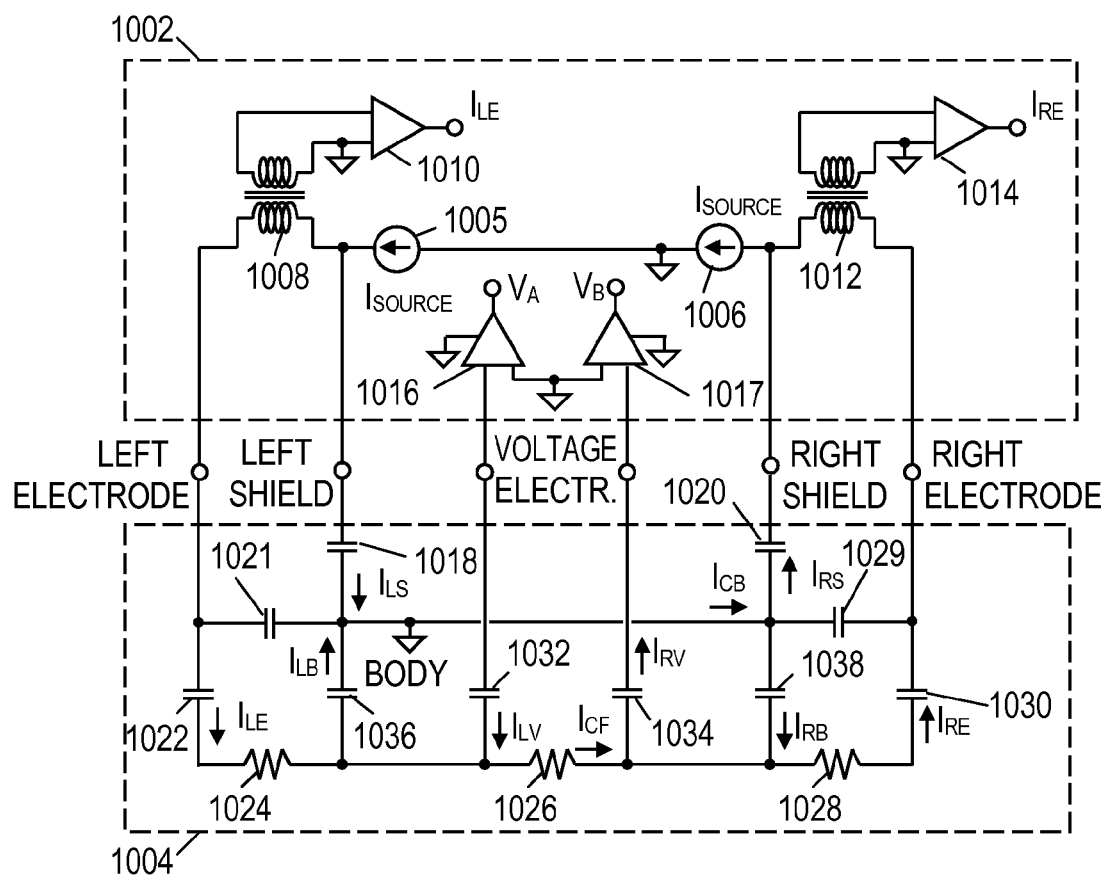
FIG. 10A shows an illustrative dual-transmitter circuit model for the illustrative sensor pad.

FIG. 10A shows an illustrative circuit model for pad 502, as it operates to utilize current leakage shields and to minimize common mode voltage while measuring formation resistivity. Pad 502 comprises measurement circuitry 1002 coupled to the voltage electrodes, current electrodes, and the electrode shields. The various electrodes and shields in turn couple to the measurement environment that is modeled as an equivalent circuit 1004. The equivalent circuit 1004 is a simplified approximation of the borehole wall's electrical characteristics, and is provided here as an aid to understanding the configuration of the measurement circuitry 1002.

In a preferred embodiment of the present invention, measurement circuitry 1002 comprises current or voltage source transmitters 1005, 1006 that drive an oscillating current between the current electrodes ("right electrode" and "left electrode"). Transmitters 1005, 1006 are also coupled between the electrode shields ("right shield" and "left shield") to maintain the shields at approximately the same potential as their corresponding electrodes. Current sensors are coupled to the current electrodes to measure simultaneous current flows from the two current electrodes. In the illustrative embodiment, transformer 1008 is coupled between the source and the left current electrode to convert the electrode current into a voltage that is measured by a first sense amplifier 1010. Similarly, transformer 1012 is coupled between the source and the right current electrode to convert the electrode current into a voltage that is measured by a second sense amplifier 1014. Note that the illustrated configuration of transformers 1008, 1012 couples the primary between the corresponding shield and current electrode, so that current flow from the shield is not included as part of the measured current flow from the current electrodes.

The two independently controlled transmitters 1005, 1006, or excitation sources, are connected to a ground common to all circuitry in pad 502. Transmitters 1005, 1006 each have separate controls for the relative magnitude and the relative phase of the excitation signal. The ability to control one or both of transmitters 1005, 1006 provides the capability to inject a synchronized excitation current from the right electrode and left electrode at the desired frequency with relative phase and/or amplitude independently controlled as required for achieving the needed amplitude and phase to minimize the common mode voltage. In certain embodiments, the control of transmitters 1005, 1006 may be accomplished by the use of either firmware or hardware based Numerically Controlled Oscillators (NCO's). Alternatively, the control of transmitters 1005, 1006 may be accomplished by use of Phase-Locked-Loops (PLL's).

Initially, detectors 1016, 1017 are utilized to measure the common mode voltage at voltage electrodes 504 by sampling the voltage signals $V_A$ and $V_B$ using an analog-to-digital converter. The digital signals are then averaged to find the common mode voltage $V_C$ (i.e., $V_C=(V_A+V_B)/2$). In addition, the relative phase may be determined by performing quadrature detection in firmware. In the present embodiment, it is contemplated that the power rails for detectors 1016, 1017 are at regulated offsets from a voltage on their reference terminals (which are shown connected to ground in FIGS. 10A and 10B, and shown connected to an offset voltage source 1009 in FIG. 10C).

Once the common mode voltage at voltage electrodes 504 is known, the differential voltage created by the current electrodes 506, 508 may be altered to reduce the common mode voltage and thereby minimize its effect on the measurement of the adjacent formation resistivity. A controller module may set the amplitude and phase of transmitters 1005, 1006 in response to the measurement of the signals from each voltage electrode. With the phase and magnitude of the common mode voltage signal known, and the phase and magnitude of transmitters 1005, 1006 controllable, the controller adjusts the voltage of the current electrodes such that the desired excitation current is obtained and the common mode signal is minimized.

Transmitters 1005, 1006 are coupled to the right electrode and left electrode through transformers 1008, 1012. Right electrode 506 and left electrode 508 inject an excitation current into the formation, creating a voltage difference in the formation that is measured by voltage electrodes 504. During the injection of an excitation current, a voltage between the common ground of detectors 1016, 1017 and the borehole formation in front of voltage electrodes 504 is created that constitutes a common mode voltage ($V_C$). The common mode voltage $V_C$ is the sum of the voltages contributed from transmitters 1005, 1006 ($V_1$ and $V_2$, respectively), in proportion to the complex gains from each transmitter ($K_{V1}$ and $K_{V2}$, respectively). Since the desire is to make $V_C$ equal to zero, then:

$$V_1 * K_{V1} = -V_2 * K_{V2}, \tag{1}$$

and, where solving the equal for $V_2$ in order to compensate for $V_1$ results in:

$$V_2 = -V_1 * K_{V1}/K_{V2}, \tag{2}$$

and, where the amplitude $A=|V_1+V_2|$ is the total voltage drop to create the desired formation excitation current, then the magnitude of voltage $V_1$ can be calculated as:

$$|V_1| = A/1 - K_{V1}/K_{V2}. \tag{3}$$

If the system is linear, equations (2) and (3) provide an accurate solution to generating the desired excitation current magnitude while balancing the common mode voltage to zero. In some instances, a residual common mode voltage may remain after the steps of altering the operating current injected into the formation, in which case an adaptive trimming process may be performed. Further, in certain embodiments the common mode voltage minimization method may be executed concurrently with the common mode measurement process, resulting in a system that dynamically maintains the common mode voltage at or near zero, regardless of changes in surrounding conditions.

Once the common mode voltage is known, the independent control of transmitters 1005, 1006 is established, and the current electrode voltages are altered to minimize common mode voltage, the imaging of the adjacent borehole wall resistivity may proceed with minimal impact from common mode voltage. Current sensors, comprising transformers 1008, 1012 and amplifiers 1010, 1014, are coupled to the right electrode and left electrode to measure simultaneous current flows from the two current electrodes. The measured currents may be corrected to compensate for baseline current flow in the manner previously described (i.e., the current flow that would be measured if the tool were isolated in air).

In addition to current sense amplifiers 1010, 1014 for the current measurements, measurement circuitry 1002 includes detectors 1016, 1017 for each voltage electrode pair to measure the potential difference generated by the formation currents. The potential difference ($\delta V$) may be quantified as the difference between voltage signals $V_A$ and $V_B$ (i.e., $\delta V = V_A - V_B$). Detectors 1016, 1017 may take the form of a separate sense amplifier for each voltage electrode, and in alternative embodiments, may take the form of a differential voltage amplifier. In both cases, circuitry 1002 may include analog-to-digital converters to enable digital processing of the measured potential differences. These potential differences are associated with a position on the borehole wall and processed to estimate formation resistivity at that position.

Equivalent circuit 1004 includes components 1021-1038 that approximate a theoretical current path between the current electrodes. Capacitor 1021 represents a residual capacitive coupling between the left current electrode and the pad body, and capacitor 1022 represents a capacitive coupling between the left current electrode and the borehole wall. Resistors 1024, 1026, and 1028 represent resistive portions of the borehole wall. Capacitor 1029 represents a residual capacitive coupling between the right current electrode and the pad body, and capacitor 1030 represents a capacitive coupling between the borehole wall and the right current electrode. Capacitors 1032 and 1034 represent capacitive couplings between the voltage electrodes and the measured portion of the borehole wall.

Shield electrodes are incorporated behind each current electrode to minimize direct capacitive coupling (represented by capacitors 1021 and 1029) between the current electrodes and the pad body, but in the process, relatively large capacitive couplings represented by capacitors 1018 and 1020 are created between the shields and the pad body. Also indirect coupling between the current electrodes and the pad body is present as represented by capacitors 1036 and 1038. The current labeled $I_{CF}$ flows through resistor 1026, and it is the current of interest for determining resistivity. Given the measured electrode currents and assuming that the leakage currents to the tool of the body are minimized and accounted for in light of the shield and current sensor configuration, and that the measured currents have been corrected by subtracting the baseline current derived from the tool's air calibration constant, it is possible to estimate the current of interest, $I_{CF}$, and hence the resistivity of the adjacent borehole wall formation.

A processor may be provided as part of measurement circuitry 1002 to calculate resistivity values. Alternatively, current and voltage measurements may be communicated to surface computing facilities to calculate the resistivity values. The resistivity estimation can be expressed as a function:

$$R = f(\delta V, I_{LE}, I_{RE}) \tag{4}$$

where $I_{LE}$ is the current present at the left current electrode, and $I_{RE}$ is the current present at the right current electrode. The function can take a number of forms depending on experimentally measured sensor pad characteristics. In some embodiments, the resistivity estimation is the measured voltage difference divided by a weighted sum of the measured currents, which have been corrected through accounting for shield leakage currents:

$$R = k \delta V / (c_0 I_{MAX} + c_1 I_{MIN}), \tag{5}$$

where k is a calibration constant based on the sensor pad geometry, $I_{MAX}$ is the greater of the corrected electrode currents, $I_{MIN}$ is the lesser of the corrected electrode currents, and $c_0$ and $c_1$ are weight factors that sum to unity. In one embodiment, the weight factors equal ½, while in another embodiment, $c_1 = \frac{2}{3}$. The weight factors may be determined in a manner that minimizes the mean square error in various calibration curves. In still other embodiments, the resistivity estimation is a weighted sum of resistivities determined for the separately measured currents:

$$R = c_0 R_{MIN} + c_1 R_{MAX} = c_0 (k \delta V / I_{MAX}) + c_1 (k \delta V / I_{MIN}), \tag{6}$$

where, again, k is a calibration constant based on sensor pad geometry, $I_{MAX}$ is the greater of the corrected electrode currents, $I_{MIN}$ is the lesser of the corrected electrode currents, and $c_0$ and $c_1$ are weight factors that sum to unity.

Figure 10B:
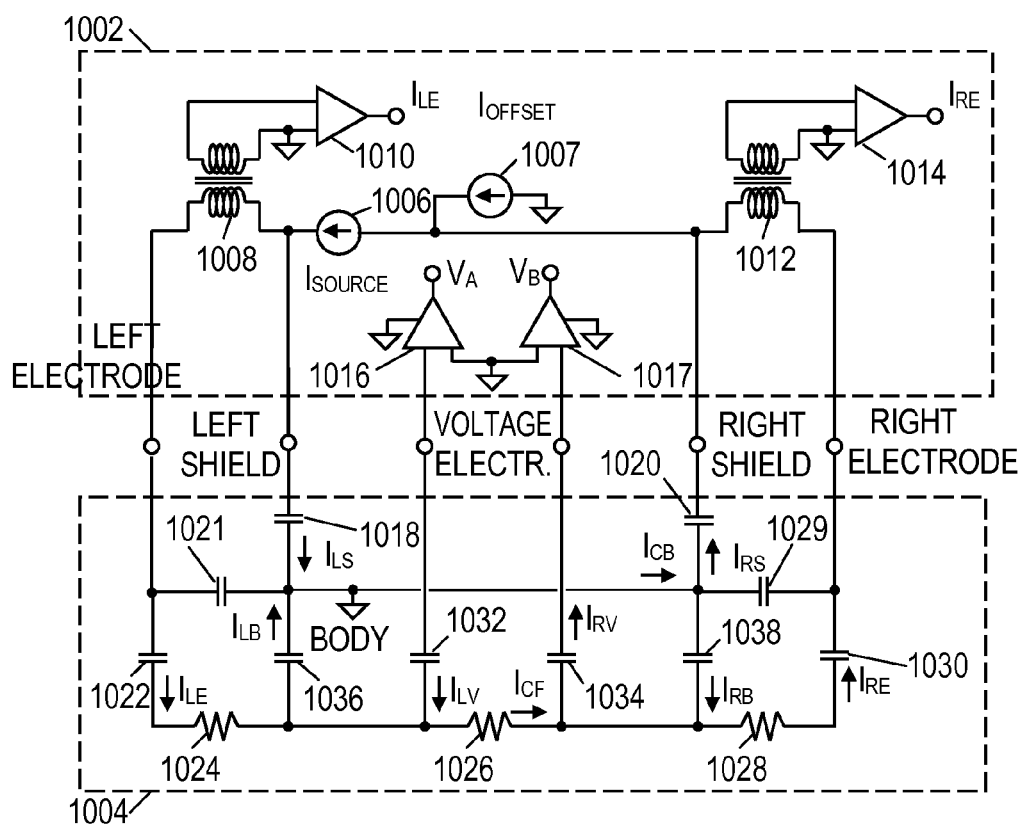
FIG. 10B shows an illustrative controller transmitter circuit model for the illustrative sensor pad.

Referring now to FIG. 10B, an alternative embodiment of the split excitation current transmitter configuration for altering current amplitude and phase is shown. In the present embodiment, transmitter 1006 may be a fixed or settable source, and may be implemented as a single stage with a reference terminal that is driven from an offset current exciter, shown as control transmitter 1007. Transmitter 1006 serves to drive the excitation current injected from current electrodes

506, 508, while control transmitter 1007 provides an ability to control the amplitude and phase offset of the current electrode voltages as required to minimize the common mode voltage present at the voltage electrodes. Control transmitter 1007 may be of the voltage source type, current source type, or a combination thereof, and is preferably controlled by the use of firmware or hardware based NCO's.

Figure 10C:
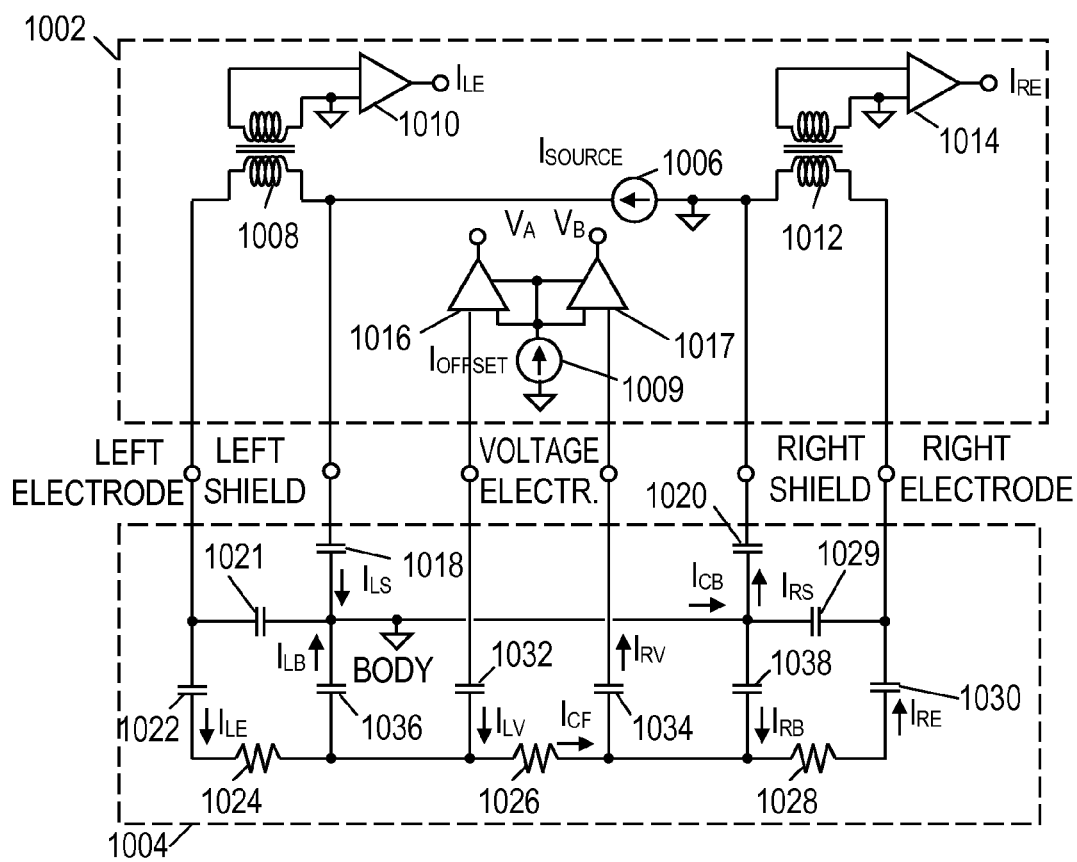
FIG. 10C shows an illustrative transmitter-controlled differential voltage amplifier circuit model for the illustrative sensor pad.

Referring now to FIG. 10C, an additional alternative embodiment of a controllable excitation current transmitter for altering current amplitude and phase is shown. The present embodiment illustrates how a second transmitter 1009 may be utilized to control the reference terminals of detectors 1016, 1017 in a manner that minimizes the perceived common mode voltage signal at the input signal of detectors 1016, 1017. In other words, the common mode voltage is added to the regulated offset of each power rail for the detectors 1016, 1017 in order to make the common mode voltage appear to detectors 1016, 1017 to equal zero. Transmitter 1009 may be of the voltage source type, current source type, or a combination thereof, and is preferably controlled by the use of firmware or hardware based NCO's.

Figure 11:
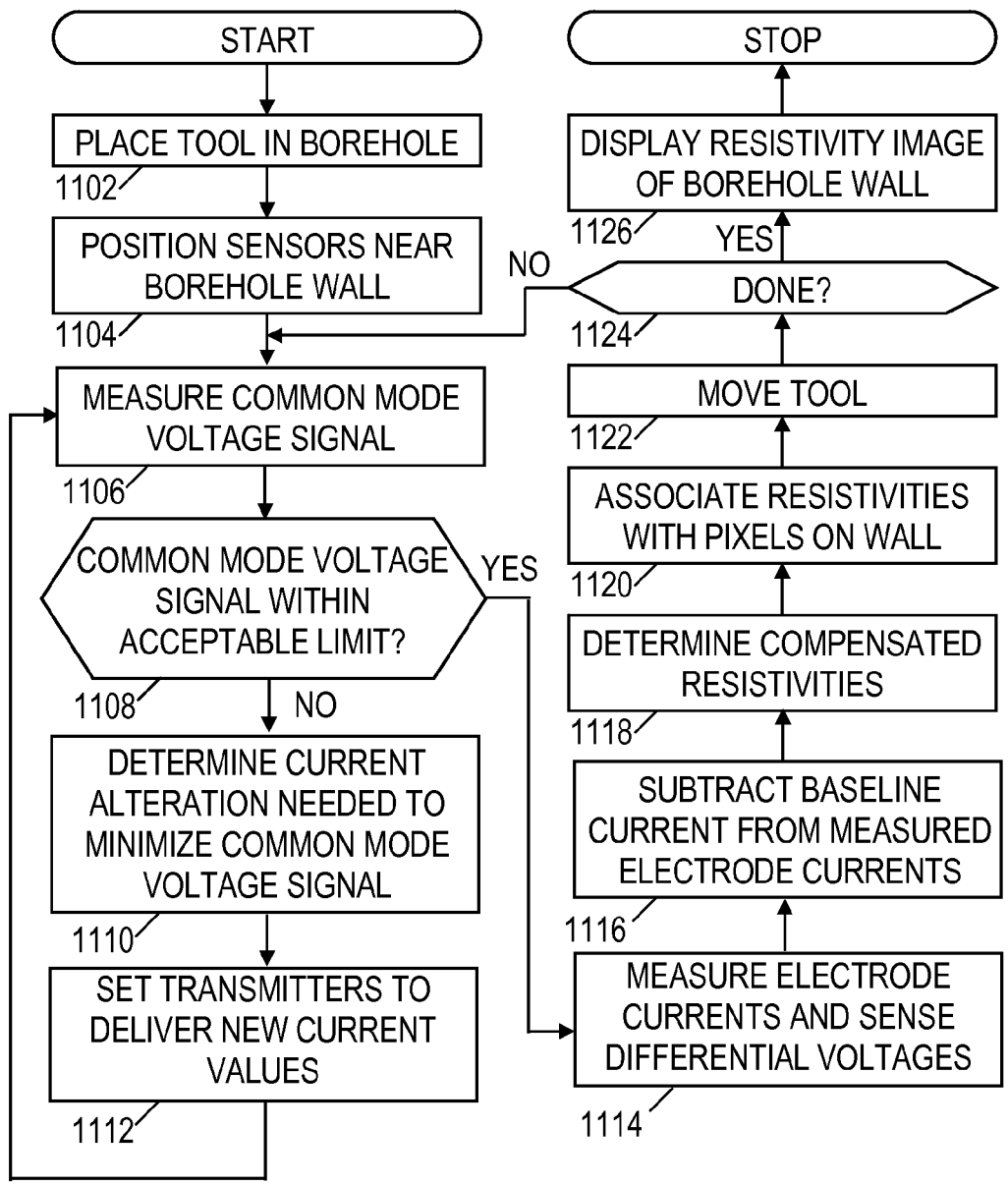
FIG. 11 shows a flow diagram of an illustrative imaging method with standoff compensation.

FIG. 11 shows a flow diagram of a resistivity imaging method. In block 1102, the resistivity imaging tool is placed in a borehole. For LWD, the tool is part of the bottom hole assembly to perform logging as drilling operations are performed. For wireline logging, the tool is part of a sonde that is lowered to the bottom of the region of interest to perform logging as the logging tool is pulled uphole at a steady rate.

In block 1104, the tool is placed in logging mode. For LWD, this operation may (or may not) involve deploying a de-centralizer that forces sensors in the tool body against the borehole wall. Alternatively, the LWD resistivity imaging tool may have one or more sensor pads that are deployed against the borehole wall. For wireline logging, multiple sensor pads are deployed against the borehole wall.

Blocks 1106-1124 represent operations that occur during the logging process. Though shown and described in a sequential fashion, the various operations may occur concurrently, and moreover, they may simultaneously occur for multiple voltage electrode pairs and multiple sensor pads.

In block 1106, the tool measures the potential difference between the formation and the differential voltage amplifier reference ground, referred to as the common mode voltage signal. In block 1108, a check of the common mode voltage measurement is performed to determine if the common mode voltage signal is within a limit acceptable to gathering accurate differential voltage measurements from the formation. If the common mode voltage signal is not within acceptable limits, in block 1110 the magnitude of excitation current amplitude and/or phase alteration that is needed to minimize the common mode voltage signal is determined. The excitation current transmitters are then set to deliver new current electrode voltage amplitude and/or phase to minimize the common mode voltage signal in block 1112, and the source driving the current electrodes may be biased so as to bring the average voltage electrode voltage to approximately zero volts. The biasing operation serves to minimize the current (and hence the voltage drop) across the mud layers in front of the voltage electrodes as represented by capacitors 1032 and 1034 in FIGS. 10A-10C. Blocks 1106-1112 may be repeated until the common mode voltage is detected within limits acceptable for formation resistivity imaging.

Once the common mode voltage is determined to be within an acceptable limit, in block 1114 the tool measures the currents through the two current electrodes, which have been corrected through accounting for shield leakage current as a result of the shield and current sensor placement. The tool further measures the voltage difference between the various voltage electrode pairs. In certain embodiments, a baseline current is subtracted from the current measured through the two current electrodes in block 1116. The baseline current is experimentally determined from the air calibration constant associated with the tool. In block 1118, the tool determines a compensated resistivity measurement for each voltage electrode pair in accordance with one of equations (4), (5), or (6). In block 1120, the tool, or more likely, the surface logging facility coupled to the tool, associates the compensated resistivity measurements with a tool position and orientation measurement, thereby enabling a determination of borehole wall image pixel values.

In block 1122, the tool moves along the borehole, and in block 1124, a check is performed to determine whether logging operations should continue (e.g., whether the logging tool has reached the end of the region of interest). For continued logging operations, blocks 1106-1124 are repeated. Once logging operations are complete, the surface logging facility maps the resistivity measurements into borehole wall image pixels and displays a resistivity image of the borehole wall in block 1126.

A variety of voltage electrode geometries are possible and may be used. A greater number of voltage electrodes may provide higher resolution at the expense of increased processing costs. In such arrangements it is contemplated that the common mode voltage to be minimized will be the average of voltage signals from all of the voltage electrodes at which measurements are being taken. The operating voltages and currents may vary widely while remaining suitable for the logging operations described herein. It has been found that source current frequencies above about 5 kHz, and perhaps as high as 100 kHz or more, are desirable as they reduce the mud layer impedances and increase the voltage differences measurable between the voltage electrodes. Higher frequencies generally provide larger measurement signals, but they also increase leakage currents, making the compensation methods disclosed herein even more desirable. In some tool embodiments, the source current frequency may be switchable between low frequency (e.g., 10 kHz) and high frequency (e.g., 80 kHz) for measurements in formations of differing resistivity. Higher frequencies may be preferred for formations having a generally lower resistivity, and vice versa.

While illustrative embodiments of this invention have been shown and described, modifications thereof can be made by one skilled in the art without departing from the spirit or teaching of this invention. The embodiments described herein are illustrative and are not limiting. Many variations and modifications of the system and apparatus are possible and are within the scope of the invention. For example, though the disclosure and claims use the term "resistivity", it is widely recognized that conductivity (the inverse of resistivity) has a one-to-one correspondence with resistivity and, consequently, often serves as a functional equivalent to resistivity. Accordingly, the scope of protection is not limited to the embodiments described herein, but is only limited by the claims which follow, the scope of which shall include all equivalents of the subject matter of the claims.

What is claimed is:

1. A logging method that comprises:
    generating an oscillatory electric field using at least two current electrodes on a sensor array proximate to a borehole wall;
    measuring a differential voltage with at least two voltage electrodes using a voltage detector, wherein the at least two voltage electrodes are positioned between the at least two current electrodes; and measuring current flows from each of the at least two current electrodes using respective current sensors, each current sensor being coupled to one of the current electrodes.

2. The method of claim 1, further comprising:
using the measured current flows at the at least two current electrodes to determine a resistivity measurement that is associated with a position on the borehole wall.

3. The method of claim 2, further comprising:
forming a borehole wall image from multiple such resistivity measurements.

4. The method of claim 2, wherein said using operation comprises averaging the measured current flows.

5. The method of claim 2, wherein the resistivity measurement is determined in accordance with $$R=k\delta V/(c_0 I_{MAX}+c_1 I_{MIN}),$$

wherein k is a calibration constant, $\delta V$ is the differential voltage, $I_{MAX}$ is the greater of the measured current flows, $I_{MIN}$ is the lesser of the measured current flows, and $c_0$ and $c_1$ are weight factors.

6. The method of claim 2, wherein the resistivity measurement is determined in accordance with $$R=c_0(k\delta V/I_{MAX})+c_1(k\delta V/I_{MIN})$$

wherein k is a calibration constant, $\delta V$ is the differential voltage, $I_{MAX}$ is the greater of the measured current flows, $I_{MIN}$ is the lesser of the measured current flows, and $c_0$ and $c_1$ are weight factors.

7. The method of claim 1, wherein the electric field is provided with an oscillation frequency above 5 kHz.

8. The method of claim 1, wherein each of the at least two current electrodes are provided with conductive shields to minimize leakage current from the at least two current electrodes.

9. The method of claim 8, further comprising:
determining a common mode voltage for the at least two voltage electrodes; and
setting a reference voltage of the voltage detector approximately equal to the common mode voltage.

10. The method of claim 9, further comprising:
providing a first excitation source coupled between a ground node and a corresponding one of the current electrodes;
providing a second excitation source coupled between the ground node and a corresponding second of the current electrodes; and
producing a synchronized excitation voltage at a desired frequency with the relative phase and amplitude independently controlled.

11. The method of claim 10, wherein the reference voltage is the ground node, and wherein said setting comprises adjusting gains of the first excitation source and the second excitation source to minimize the common mode voltage.

12. The method of claim 1, further comprising:
measuring a voltage associated with each of the at least two current electrodes;
multiplying the voltage by an air calibration constant to determine a baseline current for each of the at least two current electrodes; and
subtracting the baseline current from the measured current flow from each of the at least two current electrodes.

13. A logging tool that comprises:
a sensor array having at least two voltage electrodes positioned between at least two current electrodes, wherein the at least two current electrodes are energized to create an oscillatory electric field in a formation forming a borehole wall;
a voltage detector coupled to the at least two voltage electrodes to measure a differential voltage induced by the electric field; and
at least two current sensors, each coupled to a corresponding one of the current electrodes to measure current flow.

14. The tool of claim 13, further comprising a processor in communication with the voltage detector and the at least two current sensors to determine a resistivity from the differential voltage and the measured current flows.

15. The tool of claim 14, further comprising a tool position detector that determines a position to be associated with the resistivity.

16. The tool of claim 15, further comprising a tool orientation detector that determines a borehole azimuth to be associated with the resistivity.

17. The tool of claim 14, wherein the resistivity is determined in accordance with:

$$R=k\delta V/(c_0 I_{MAX}+c_1 I_{MIN}),$$

wherein k is a calibration constant, $\delta V$ is the differential voltage, $I_{MAX}$ is the greater of the measured current flows, $I_{MIN}$ is the lesser of the measured current flows, and $c_0$ and $c_1$ are weight factors.

18. The tool of claim 14, wherein the resistivity is determined in accordance with $$R=c_0(k\delta V/I_{MAX})+c_1(k\delta V/I_{MIN})$$

wherein k is a calibration constant, $\delta V$ is the differential voltage, $I_{MAX}$ is the greater of the measured current flows, $I_{MIN}$ is the lesser of the measured current flows, and $c_0$ and $c_1$ are weight factors.

19. The tool of claim 13, wherein the electric field is provided with an oscillation frequency above 5 kHz.

20. The tool of claim 13, wherein each of the at least two current electrodes are provided with a corresponding conductive shield to minimize leakage current from the at least two current electrodes.

21. The tool of claim 13, wherein the voltage detector measures a common mode voltage created by the oscillatory electric field, and wherein the common mode voltage is minimized by independently controlling the relative phase and amplitude of an excitation voltage.

22. The tool of claim 13, further comprising at least two line shields corresponding to the at least two current electrodes.

23. A logging system that comprises:
a logging tool having:
a sensor array with at least two voltage electrodes positioned between at least two current electrodes, wherein the at least two current electrodes are powered by an excitation source to create an electric field in a borehole wall; and
an electronic circuit coupled to the at least two current electrodes to determine a differential voltage between the at least two voltage electrodes, wherein the electronic circuit includes at least two current sensors, each coupled to a corresponding current electrode to measure a current flow; and
a computing circuit in communication with the logging tool to determine a borehole wall resistivity as a function of at least one of depth and azimuth, wherein the resistivity is determined using the measured current flows and the differential voltage.

24. The system of claim 23, wherein the resistivity is determined in accordance with $$R = k\delta V/(c_0 I_{MAX} + c_1 I_{MIN}),$$

wherein k is a calibration constant, $\delta V$ is the differential voltage, $I_{MAX}$ is the greater of the measured current flows, $I_{MIN}$ is the lesser of the measured current flows, and $c_0$ and $c_1$ are weight factors.

25. The system of claim 23, wherein the resistivity is determined in accordance with $$R = c_0(k\delta V/I_{MAX}) + c_1(k\delta V/I_{MIN})$$

wherein k is a calibration constant, $\delta V$ is the differential voltage, $I_{MAX}$ is the greater of the measured current flows, $I_{MIN}$ is the lesser of the measured current flows, and $c_0$ and $c_1$ are weight factors.

* * * * *